(12) United States Patent
Yelovitch et al.

(10) Patent No.: US 11,295,390 B2
(45) Date of Patent: Apr. 5, 2022

(54) DOCUMENT INTEGRATION INTO POLICY MANAGEMENT SYSTEM

(71) Applicant: Hippo Analytics Inc., Mountain View, CA (US)

(72) Inventors: Arie Yelovitch, Santa Clara, CA (US); Michael P. Gulla, Cupertino, CA (US)

(73) Assignee: Hippo Analytics Inc., Palo Alto, CA (US)

( * ) Notice: Subject to any disclaimer, the term of this patent is extended or adjusted under 35 U.S.C. 154(b) by 0 days.

(21) Appl. No.: 16/357,492

(22) Filed: Mar. 19, 2019

(65) Prior Publication Data

US 2020/0302542 A1 Sep. 24, 2020

(51) Int. Cl.
*G06Q 40/08* (2012.01)
*G06Q 40/02* (2012.01)

(52) U.S. Cl.
CPC ........... *G06Q 40/08* (2013.01); *G06Q 40/025* (2013.01)

(58) Field of Classification Search
CPC .............................. G06Q 40/08; G06Q 40/025
See application file for complete search history.

(56) References Cited

U.S. PATENT DOCUMENTS

| | | | | |
|---|---|---|---|---|
| 7,698,230 B1* | 4/2010 | Brown | ................. | G06Q 30/018 705/75 |
| 2006/0069685 A1* | 3/2006 | Dickens | ................. | G06Q 10/10 |
| 2007/0204285 A1* | 8/2007 | Louw | ............... | H04N 21/47815 725/14 |
| 2009/0119133 A1* | 5/2009 | Yeransian | .............. | G06Q 40/08 705/4 |
| 2009/0193053 A1* | 7/2009 | Swart | .................. | G06F 16/2228 |
| 2012/0239417 A1* | 9/2012 | Pourfallah | ........... | G06Q 20/102 705/2 |
| 2014/0136937 A1* | 5/2014 | Patel | ....................... | G06F 40/18 715/212 |
| 2015/0199534 A1* | 7/2015 | Francis | ................... | G06F 21/78 726/28 |
| 2016/0055588 A1* | 2/2016 | Keenan | .................. | G06Q 40/08 705/4 |
| 2016/0342752 A1* | 11/2016 | Stueckemann | ..... | G06F 19/3456 |
| 2017/0242852 A1* | 8/2017 | Clain | ..................... | G06F 9/451 |
| 2017/0345028 A1* | 11/2017 | Harris | ............... | G06Q 30/0201 |

* cited by examiner

*Primary Examiner* — Scott C Anderson
(74) *Attorney, Agent, or Firm* — Schwegman Lundberg & Woessner, P.A.

(57) ABSTRACT

A technique for integrating documents and data into a policy management system issues an event trigger from a memory system upon receipt of documents and data related to an insurance policy. An SFTP system runs software for identifying documents and data required for the insurance policy and designating access rights to the same by users and vendors and for specifying actions to be performed upon receipt of the identified documents and data. The event trigger causes the SFTP system to perform the specified actions associated with the received document or data and to push the uploaded documents and/or the results from performance of the specified actions to the users and/or vendors having access rights to the uploaded documents and/or results. The insurance policy is represented in a JSON data structure that defines the document and data management policies and an order of process tasks required for the insurance policy.

14 Claims, 5 Drawing Sheets

DOCUMENT INTEGRATION INTO POLICY MANAGEMENT SYSTEM

TECHNICAL FIELD

The subject matter disclosed herein generally relates to an online system and method that facilitates online insurance and loan applications and, in particular, to an online system and method that automatically integrates internal and external insurance and loan documents into a policy management system.

BACKGROUND

The process of obtaining insurance on property or collateralizing a loan requires the agent to collect information from a potential customer about the customer and, in the case of insurance or a loan on property such as a home, information about the home. Whether the insurance or loan application is submitted online or in person, the process requires the potential customer to provide the personal information and the property information in an application that is then used to obtain a quote.

Generally, an underwriting period (e.g., 60 days) is required to purchase property. During the underwriting period, the home is typically inspected, and the inspection information is provided to the insurance carrier to update the insurance policy information. Unfortunately, scheduling of the home inspection, performing the home inspection, and updating the insurance information is a time-consuming process that is often the limiting factor in completing the loan and insurance underwriting in a timely manner. Techniques for streamlining the home inspection and other aspects of the underwriting process are needed.

It is desirable to use computer technology to implement new ways to speed up the underwriting process. For example, the process could be accelerated if the computer system could automatically recognize events such as receipt of a home inspection report to trigger notification of interested parties and the next action in the underwriting process. It also would accelerate the process if received documents such as home inspection reports could be dynamically linked to document management policies whereby the next step in a document management process may be initiated without human intervention upon upload of particular documents.

SUMMARY OF THE EMBODIMENTS

The systems and methods described herein address the afore-mentioned and other needs in the art by providing an online system and method that links uploaded documents to data management policies by linking the insurance policy structure to uploaded PDF files using a JavaScript Object Notation (JSON) data structure having a number of attributes. Upon receipt of an uploaded document, an event is automatically triggered in a diary system of the cloud storage system that triggers another review in a document management process, such as the document management process associated with an underwriting process. In sample embodiments, the process is performed in an Secure File Transfer Protocol (SFTP) system without an application programming interface (API), so no knowledge of the underlying document processing system is required. Rather, the JSON data structure sets forth the document and data management policies and the order of process tasks. The JSON data structure is batch processed at least daily to automatically trigger the next process task.

In sample embodiments, a system is provided that comprises a memory system that receives documents and data related to an insurance policy, a machine-readable storage device that stores computer-executable instructions, and at least one hardware processor communicatively coupled to the machine-readable storage device that, when the computer-executable instructions are executed, configures the system to integrate documents and data into a policy management system. The steps performed by the at least one hardware processor include identifying documents and data required for an insurance policy and designating access rights to the documents and data by at least one of users and vendors, specifying actions to be performed upon receipt of the identified documents and data, and creating event triggers to cause performance of the specified actions associated upon receipt of an uploaded document or data. An SFTP system pushes at least one of the uploaded documents and results from performance of the specified actions to at least one of the users and vendors having access rights to the at least one of the uploaded documents and results. The insurance policy is represented in a JSON data structure that defines the document and data management policies for the insurance policy and an order of process tasks associated with the documents and data required for the insurance policy. In sample embodiments, the JSON data structure provides field breakdowns and/or parsed fields of the insurance policy so that the at least one of the users and vendors only receive the portions of the documents and data relevant to the respective user or vendor.

In sample embodiments, the memory system issues an event trigger upon receipt of a document or data related to the insurance policy. The event trigger causes a notification to be sent to the SFTP system to initiate performance of the actions associated with the document or data that caused the event trigger. The SFTP system publishes the document or data associated with the event trigger and results from performance of the specified actions to a file folder in a database. The file folder has access rights limited to the user or vendor having access rights to the document or data associated with the event trigger.

In the sample embodiments, the SFTP system comprises an SFTP service that is invoked upon receipt of an event trigger to invoke a diary system for the insurance policy that links the insurance policy to the documents and data required for the insurance policy.

Other sample embodiments include a method of integrating documents and data into a policy management system comprising the steps of identifying documents and data required for an insurance policy and designating access rights to the documents and data by at least one of users and vendors, specifying actions to be performed upon receipt of the identified documents and data, creating event triggers to cause performance of the specified actions associated upon receipt of an uploaded document or data, and pushing, by an SFTP system, at least one of the uploaded documents and results from performance of the specified actions to at least one of the users and vendors having access rights to the at least one of the uploaded documents and results. In such embodiments, identifying the documents and data required for an insurance policy may comprise representing the insurance policy in a JSON data structure that defines the document and data management policies for the insurance policy and an order of process tasks associated with the documents and data required for the insurance policy. The JSON data structure may also represent field breakdowns and/or parsed fields of the insurance policy to enable the SFTP system to provide to the users and/or vendors only the portions of the documents and data relevant to the respective user and/or vendor.

In the sample embodiments, creating event triggers comprises a memory system issuing an event trigger upon receipt of a document or data related to the insurance policy. The event trigger causes a notification to be sent to the SFTP system to initiate performance of the actions associated with the document or data that caused the event trigger. The SFTP system may, in turn, publish the document or data associated with the event trigger and results from performance of the specified actions to a file folder in a database. The file folder has access rights limited to the user or vendor having access rights to the document or data associated with the event trigger.

In the sample embodiments, specifying the actions to be performed upon receipt of the identified documents and data comprises programming a diary system for the insurance policy with the actions to be performed upon receipt of each document and data associated with the insurance policy. Also, an SFTP service may be invoked upon receipt of an event trigger. In turn, the SFTP service invokes the diary system for the insurance policy that links the insurance policy to the documents and data required for the insurance policy.

The systems and methods described herein are also implemented in sample embodiments as a machine-readable storage device storing computer-executable instructions that, when executed by at least one processor, implements a method of integrating documents and data into a policy management system using the disclosed methods.

As discussed herein, the logic, commands, or instructions that implement aspects of the methods described herein be provided in a computing system including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described herein, or other aspects depicted in the accompanying drawings and detailed description below. Such systems and computer-readable media including instructions for implementing the methods described herein also constitute sample embodiments.

This summary section is provided to introduce aspects of the inventive subject matter in a simplified form, with further explanation of the inventive subject matter following in the text of the detailed description. This summary section is not intended to identify essential or required features of the claimed subject matter, and the particular combination and order of elements listed this summary section is not intended to provide limitation to the elements of the claimed subject matter. Rather, it will be understood that the following section provides summarized examples of some of the embodiments described in the Detailed Description below.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example and not limitation in the figures of the accompanying drawings of which.

DETAILED DESCRIPTION

The following description with respect to FIGS. 1-5 sufficiently illustrates specific embodiments to enable those skilled in the art to practice them. Other embodiments may incorporate structural, logical, process, and other changes. Portions and features of some embodiments may be included in, or substituted for, those of other embodiments. Embodiments set forth in the claims encompass all available equivalents of those claims.

Insurance providers use policy management systems to manage the documents and procedures needed to underwrite an insurance policy. For example, such systems manage the completion of internal documentation such as expression of interest (EOI) including responses to requests for proposal (RFP), documentation of election or cancellation, reinstatement requests, refunds, quote, and the like. Policy management systems also manage the completion of external documentation such as documents from vendors, analytics, third party information about the insured property, inspection reports from third party providers, and the like. Such policy management systems also manage document access by different interested parties including the underwriter, the customer, the insurance agent, and third-party service providers. However, while conventional policy management systems manage the documents, the policy management systems do not drive the completion of the underwriting process. Methods for driving the rapid completion of the underwriting process are desired, as the underwriting process may take up to 60 days or more and is by far the slowest part of the process of obtaining insurance. For example, an underwriter may wait 30-40 days for an inspection to get into the policy management system and other steps in the process are put on hold until the inspection is received.

A policy management system is desired that drives the collection and integration of documents into the policy management system with little or no human intervention. For example, the policy management system described herein may schedule inspections, drive the completion of the inspection documents, and notify all relevant parties and processes automatically when the inspection report is uploaded into the policy management system. The policy management system applies SFTP functionality to insurance processing to, for example, trigger that the inspection report has arrived and immediately send the inspection files to all who need that information. By incorporating such technology and procedures into the policy management process, all policies requiring an inspection may be immediately updated upon receipt of the inspection report without waiting for human intervention. The policy management system described herein thus reduces the time and resources needed to process an insurance policy.

Figure 1:
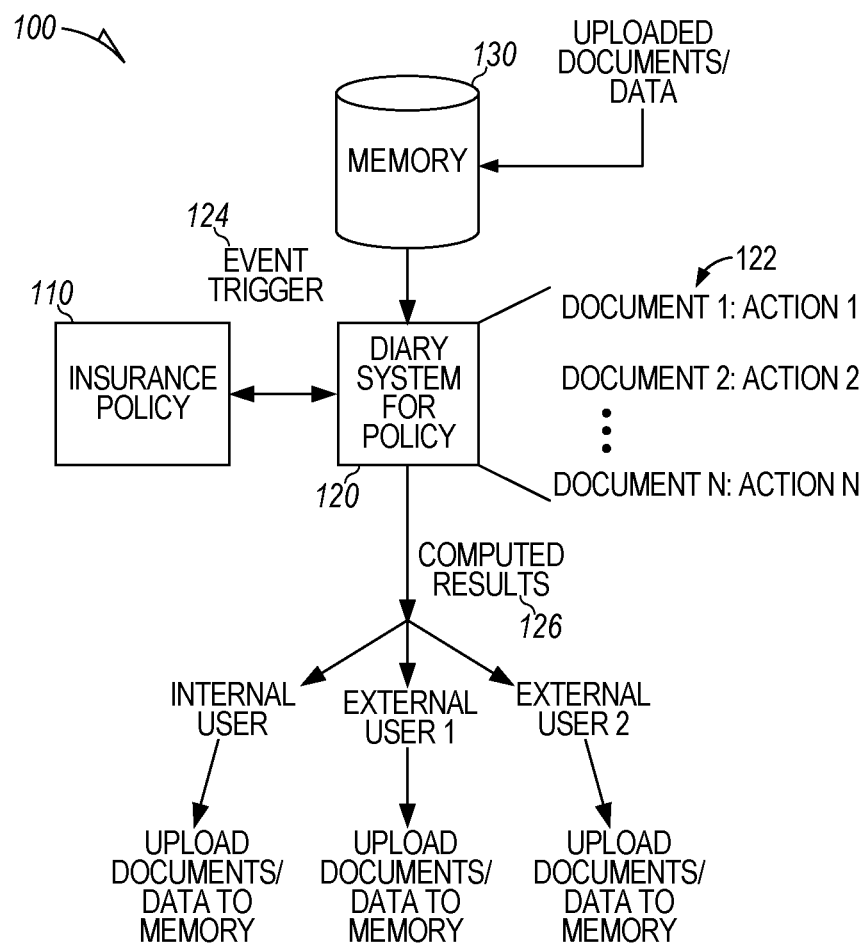
FIG. 1 illustrates a policy management system in a sample embodiment.

FIG. 1 illustrates an example policy management system 100 in a sample embodiment. As illustrated, an insurance policy 110 is digitized and a diary system 120 for the insurance policy 110 is created to identify and track the items needed for completion of the insurance policy 110. For example, the diary system 120 may include a listing of the documents that are required to complete the underwriting for the insurance policy 110 as well as the associated actions 122 that are to be completed upon receipt of a particular document. When a document is uploaded to memory 130, an event trigger 124 is generated that causes the diary system 120 to perform the action 122 corresponding to the received document that initiated the event trigger 124. For example, checks and invoices may be processed and marked as paid and comma separated values (CSV) files may be uploaded for processed invoices. The results 126 of processing of the action 122 by the diary system 120 are provided to the appropriate internal user(s) and/or external user(s) as illustrated. In turn, the internal and/or external users may initiate event triggers 124 by uploading documents to memory 130.

Figure 2:
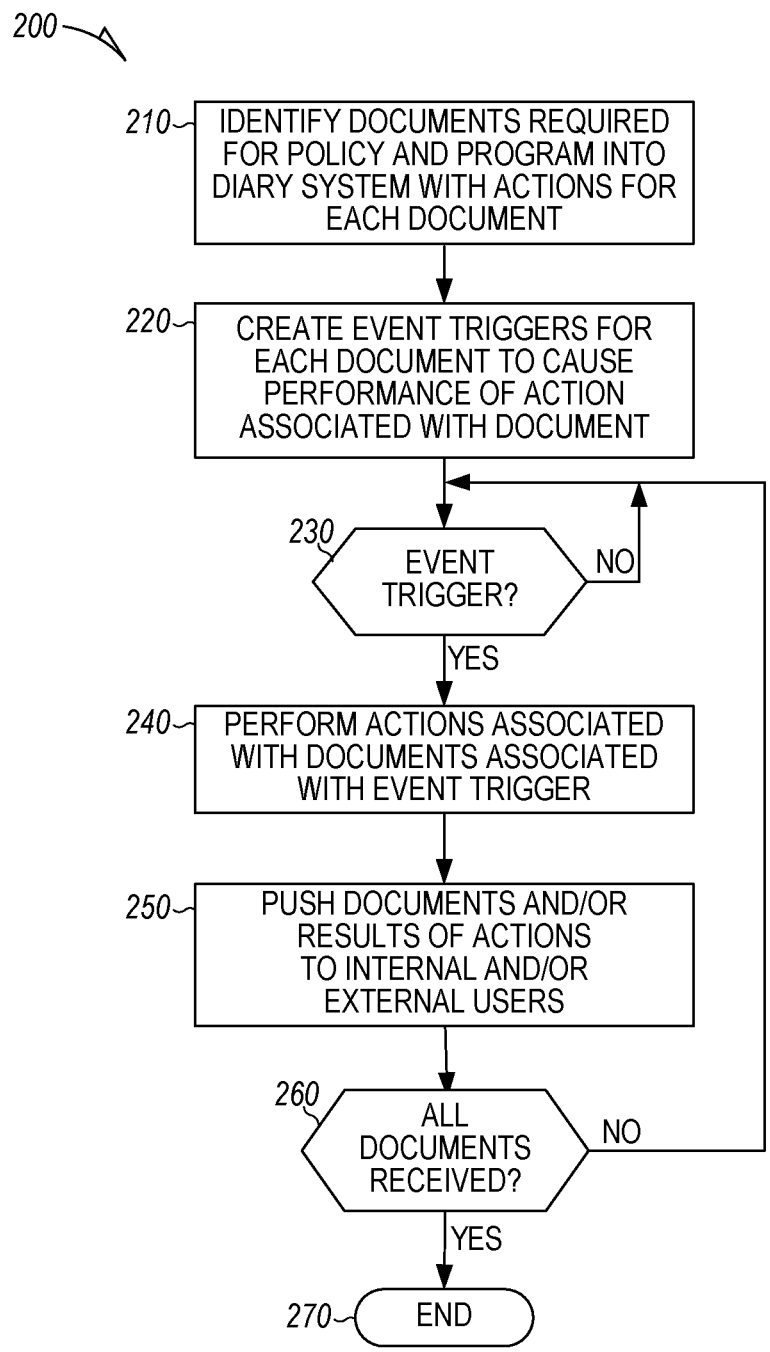
FIG. 2 illustrates the document management process implemented by the policy management system in a sample embodiment.

FIG. 2 illustrates the document management process 200 implemented by the policy management system 100 in a sample embodiment. As illustrated, the policy management system 100 first identifies the documents required to complete the insurance policy review (e.g., the documents required by the underwriter) and programs the required documents into a diary system 120 with actions for each document at 210. In this example, the diary system 120 is implemented in code that specifies actions to be performed upon receipt of particular documents. At 220, event triggers are identified for each document. These event triggers cause the performance of a specified action associated with the document. For example, when a document (e.g., inspection report) is uploaded into the policy management system 100, the uploading may trigger the processing of the document and pushing the processed document to users in need of the uploaded information.

During operation, the document management process 200 waits for a document trigger. When a document trigger is received at 230, the actions associated with the document that caused the event trigger are performed at 240. The uploaded document(s) and/or the results of the processing actions are pushed to company internal and/or company external users at 250 as specified in the diary system 120. The document management process 200 checks at 260 whether all documents for a given insurance policy have been received and, if so, the document management process ends at 270. However, if other documents are still outstanding, the process returns to 230 to wait for an event trigger. It will be appreciated that this technique enables the insurance policy underwriting process to advance automatically without waiting for users to do anything other than provide the completed documents, thereby avoiding human-driven processing delays.

In sample embodiments, the insurance policy underwriting process is implemented using a fully automated Secure File Transfer Protocol (SFTP) data processing service. Thought a number of companies provide such services, the following description is provided with respect to SFTP services available from Amazon Web Services (AWS). It will be appreciated that other SFTP services may be used to the extent such services provide comparable functionality to that described below with respect to AWS SFTP services.

In the sample embodiments, AWS Simple Storage Service (S3), AWS Lambda, and AWS DynamoDB services are used to implement a server-free SFTP transfer process that does not require any application programming interfaces (APIs). In the sample embodiments, a secure file transfer protocol (SFTP) server is mimicked and user accounts are created in AWS and the mimicked SFTP server is associated with (mapped to) one or more storage devices including the S3 buckets. In sample embodiments, an SFTP server is mimicked for each client whereby no third-party libraries are needed. The S3 system provides an object storage architecture that can be employed to store objects through a web service interface and that allows for uses such as storage for Internet applications, backup and recovery, data lakes for analytics, and cloud storage. The basic storage units of the S3 system are objects that are organized into buckets, where each object is identified by a unique, user-assigned key. The S3 system further provides a console, an AWS SDK, and a representational state transfer (REST) application programming interface (API) for managing the buckets and the objects. Requests for data in the buckets are authorized using an access control list associated with each object bucket. The objects are addressable using HTTP uniform resource locators (URLs). AWS gives the user control over user identity, permissions, and keys and uses identity and access management (IAM) policies to control the level of access granted to each user. If implemented using S3 buckets, the S3 features such as server-side encryption, versioning, and the like may be implemented as well. In sample embodiments, the SFTP services may be implemented as AWS Lambda functions that enable the user to build an intelligent file transfer protocol (FTP) site that processes incoming files as soon as they are uploaded, queries the files as appropriate, and connects the files to a data ingestion process.

The policy management process 200 described above with respect to FIG. 2 is implemented as one or more applications that are written as an AWS Lambda function and attached to one or more S3 buckets to perform post-upload processing as desired. Data management policy variables are set to appropriate values for each user to provide customized user access to the stored data.

AWS Lambda is a computing service that lets users run code without provisioning or managing servers. A user uploads code that is executed only when needed, and the system scales automatically to handle the code requests. AWS Lambda also performs the administration of the computing resources so that all the user needs to do is to supply the code in one of the languages that AWS Lambda supports, which includes, for example, Java and C #. Importantly for the present application, AWS Lambda runs code in response to events, such as changes to data in an S3 bucket or an Amazon DynamoDB table. Thus, the AWS Lambda platform may be used to build data processing triggers for the other AWS services including S3 and DynamoDB. Also, the AWS Lambda platform may be used to build serverless applications comprising functions that are triggered by events and automatically deploy the functions.

The system described herein takes advantage of such functionality to create a policy management system 100 that triggers functions upon receipt of new documents. For example, Amazon S3 publishes events when an object is created in a bucket or when a document is received in a bucket to AWS Lambda, which in turn invokes the Lambda function (user code) by passing the event data as a parameter that is processed by the user code. Amazon S3 enables the user to add bucket notification configuration data that identifies the type of event that S3 is to publish and the Lambda function that is to be invoked. AWS Lambda executes an invoked function by assuming the execution role specified at the time the Lambda function is created. Using the permissions policy associated with this execution role, the Lambda function is granted the permissions that it needs. S3 is also granted the permissions it needs to invoke the Lambda function via the permissions policy associated with the Lambda function.

Figure 3:
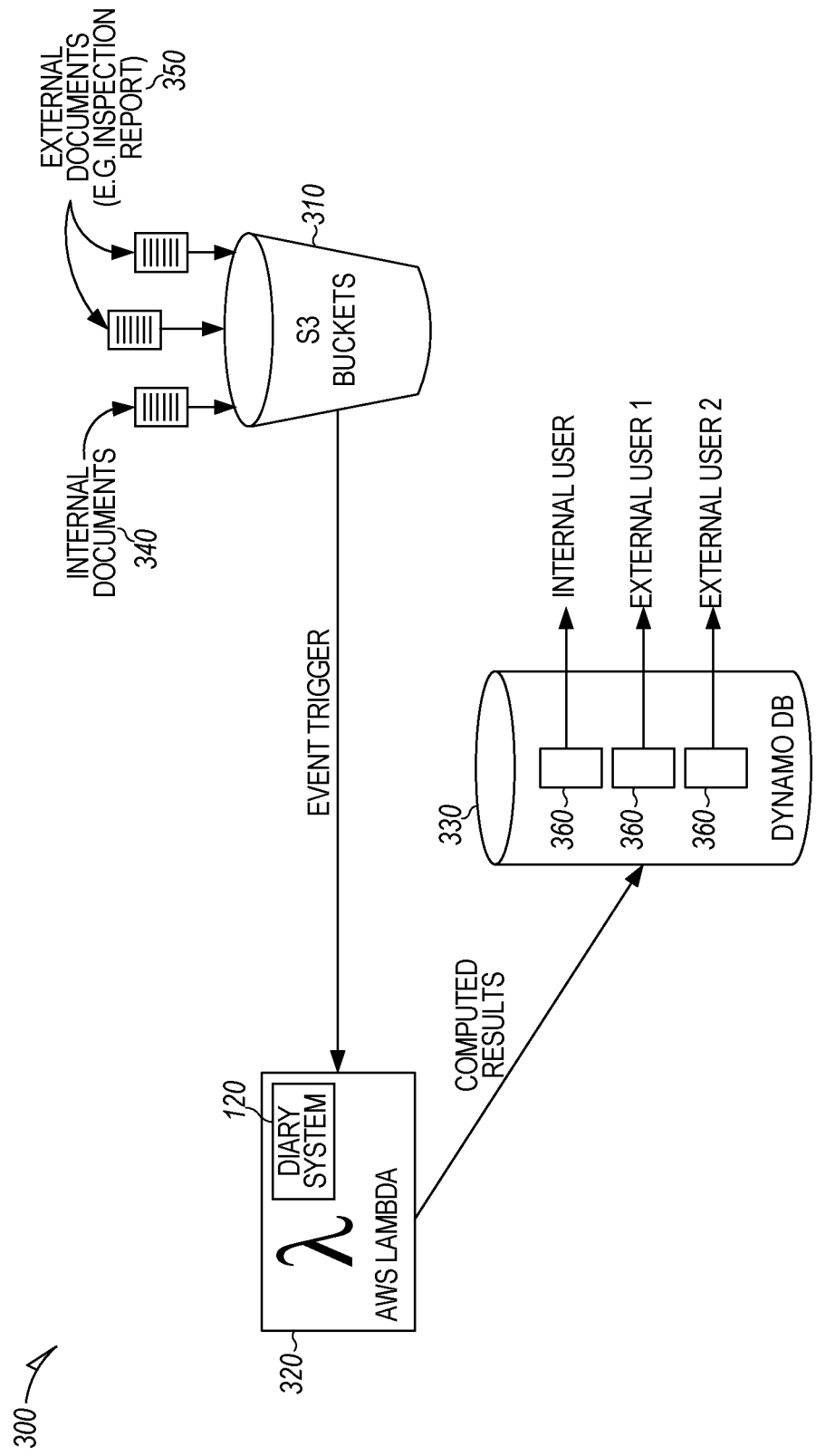
FIG. 3 illustrates a policy management process implemented on an AWS system platform including S3 buckets, a Lambda service, and a DynamoDB.

As illustrated in FIG. 3, the policy management system 100 is implemented on an AWS system platform 300 including S3 buckets 310, AWS Lambda service 320, and the DynamoDB 330. Generally, the S3 buckets 310 receive internal documents 340 and external documents 350 and send event triggers to the AWS Lambda service upon receipt, of such documents. The event triggers invoke the actions associated with the received document in the diary system software 120 implemented in the AWS Lambda service as a Lambda function. The uploaded document and/or the computed results are provided to the DynamoDB 330 for storage in the respective files 360 of the respective users entitled to access the received documents. These user files 360 are then pushed out to the users or, conversely, the users are notified that new information has been provided to the user files 360 so that further actions may be taken by the respective users. Thus, in this embodiment, any vendors would have their own file 360 that they may check for input from the policy management system 300. Also, any documents that the vendors upload to the policy management system 300 would trigger events that are processed by the diary system 120.

In the AWS system platform 300, a user uploads the internal documents 340 and/or the external documents 350 to the S3 buckets 310 as respective objects. Such uploading creates an object-created event. The S3 buckets 310 detect the object-created event and invoke a Lambda function in the AWS Lambda service 320 that is specified in the notification configuration of the S3 buckets 310. In sample embodiments, the Lambda service 320 is a policy management system 300 including diary system 120 for collecting and processing the documents needed to approve, implement, and manage an insurance policy. Lambda service 320 executes the Lambda function including the diary system 120 by assuming the execution role that was specified at the time the Lambda function was created, and the Lambda function executes the diary system 120. In sample embodiments, the diary system 120 is coded in a data structure supported by the Lambda service 320, such as JSON, and the JSON data structure defines the document and data management policies and the order of process tasks. Other file formats such as comma-separated values (CSV) may also be used as desired. The JSON data structure may also provide field breakdowns or parsed fields so that the underwriter, vendors, agents, and other users only receive the portions of the documents that they need to read and respond to. JSON summaries of the document contents may also be provided to such persons as well.

Access permissions to the S3 buckets 310 may also be provided to others via a permissions (access) policy. In the access policies, a resource name identifier is used to identify the bucket or object to which the access policy is to be applied and the actions are specified that are allowed or denied for the identified resource. For example, the s3:List-Bucket permission allows the user permission to the S3 Get Bucket (List Objects) operation. The user may also specify what the effect will be when the user requests the specified action—either allow or deny. Finally, the actions and resources are tied to the user, account, service, or other entity who is allowed access to the actions and resources. For example, permissions may be granted to any user to perform any S3 operations on objects in a specified bucket so long as the requests originate from a range of specified IP addresses.

As an example, to allow two users A and B to have access to a bucket of S3 buckets 310, examplebucket, so that they can add, update, and delete objects while restricting each user's access to a single folder in the bucket, folders are created that match the user names:
Examplebucket:

A/
B/

To grant each user access only to his or her folder, an access policy is created for each user and is attached individually. For example, the following access policy is attached to user A to allow user A's specific S3 permissions on the examplebucket/A folder.

```
{
    "Version":"2012-10-17",
    "Statement":[
        {
            "Effect":"Allow",
            "Action":[
                "s3:PutObject",
                "s3:GetObject",
                "s3:GetObjectVersion",
                "s3:DeleteObject",
                "s3:DeleteObjectVersion"
            ],
            "Resource":"arn:aws:s3:::examplebucket/A/*"
        }
    ]
}
```

A similar access policy may also be created and attached to user B by identifying user B in the Resource value. Also, instead of attaching policies to individual users, a single access policy may be written that uses an access policy variable and is attached to a group. A group is first created, and users A and B are added to the group. The following example access policy allows a set of S3 permissions in the folder examplebucket/${aws:username}. When the access policy is evaluated, the access policy variable ${aws:username} is replaced by the requester's user name. For example, if user A sends a request to put an object, the operation is allowed only if user A is uploading the object to the examplebucket/A folder.

```
{
    "Version":"2012-10-17",
    "Statement":[
        {
            "Effect":"Allow",
            "Action":[
                "s3:PutObject",
                "s3:GetObject",
                "s3:GetObjectVersion",
                "s3:DeleteObject",
                "s3:DeleteObjectVersion"
            ],
            "Resource":"arn:aws:s3:::examplebucket/${aws:username}/*"
        }
    ]
}
```

Alternatively, rather than using user names, folders may be created based on user IDs. In such a case, the above access policy would be modified to use the ${aws:userid} access policy variable.

In another example, a group called InspectionCo may be created that represents a partner company. An IAM user is created for the specific person or application at the partner company that needs access and the user is placed in the group. An access policy is then attached that gives the group PutObject access to the following folder in the corporate bucket:
my_corporate_bucket/uploads/inspectionco.
It may also be desirable to prevent the InspectionCo group from doing anything else with the bucket, so a statement may be added that explicitly denies permission to any S3 permissions except PutObject on any S3 resource in the account.

```
{
  "Version":"2012-10-17",
  "Statement":[
    {
      "Effect":"Allow",
      "Action":"s3:PutObject",
      "Resource":"arn:aws:s3:::my_corporate_bucket/uploads/widgetco/*"
    },
    {
      "Effect":"Deny",
      "NotAction":"s3:PutObject",
      "Resource":"arn:aws:s3:::my_corporate_bucket/uploads/widgetco/*"
    },
    {
      "Effect":"Deny",
      "Action":"s3:*",
         "NotResource":"arn:aws:s3:::my_corporate_bucket/uploads/widgetco/*"
    }
  ]
}
```

As noted above, the S3 system 310 includes a notification feature that enables event notifications to issue when certain events happen in the user's bucket. To enable notifications, a notification configuration is added that identifies the events that the S3 system 310 is to publish as well as the destinations where the S3 system 310 is to send the event notifications. This configuration information is stored in a notification subresource associated with a bucket. The S3 system 310 provides an API to manage this subresource. For example, the S3 system 310 can publish notifications for a "new object created" event when a particular API is used or when an object is created regardless of the API used. Similarly, the S3 system 310 can publish notifications for an "object removal" event when an object is removed or a versioned object is permanently deleted. Events may be published to destinations including a Simple Notification Service (SNS) push messaging service, a Simple Queue Service (SQS) queue, and to the Lambda service 320. The Lambda service 320 runs user code in response to events such as image upload, in-app activity, website clicks, outputs from connected devices, and the like. The Lambda service 320 enables the creation of discrete event-driven applications that executed only when needed and scale automatically. When the S3 system 310 detects events of a specific type (e.g., an object created event), it can publish the event to Lambda service 320 and invoke the Lambda function including the diary system 120 for execution.

Enabling notifications in the S3 system 310 is a bucket-level operation in that notification configuration information is stored as XML in the notification subresource associated with a bucket. To enable notifications for events of specific types, the XML is replaced with the appropriate configuration that identifies the event types that the S3 system 310 is to publish and the destination where the events are to be published. For each destination, a corresponding XML configuration is added. For example, to invoke the Lambda function including diary system 120 and to provide an event message as an argument, the Lambda function is set as the notification destination for a specific event type and the CloudFunctionConfiguration may be added as follows:

```
<NotificationConfiguration>
    <CloudFunctionConfiguration>
        <Id>optional-id-string</Id>
        <Cloudcode>cloud-function-arn</Cloudcode>
        <Event>event-type</Event>
        <Event>event-type</Event>
        ...
```

-continued

```
    </CloudFunctionConfiguration>
    ...
</NotificationConfiguration>
```

Then, when the S3 system 310 detects an event of the specific type, it publishes a message with the event information.

Notifications may also be configured to be filtered by the prefix and suffix of the key name of objects. For example, a configuration may be set up so that a notification is sent only when image files with a ".jpg" extension are added to a bucket. On the other hand, a configuration may be used that delivers a notification to a Lambda function when an object with the prefix "images/" or "logs/" is added to a bucket in the S3 system 310. The filter XML structure is used to define the rules for notifications to be filtered by the prefix and/or suffix of an object key name.

The Lambda service 320 also may be used to consume events from a stream from the DynamoDB 330. For example, the following example code receives a DynamoDB event input and processes the messages that it contains. In this example, the code writes some of the incoming event data to CloudWatch Logs.

```
console.log('Loading function');
exports.handler = function(event, context, callback) {
    console.log(JSON.stringify(event, null, 2));
```

```
event.Records.forEach(function(record) {
    console.log(record.eventID);
    console.log(record.eventName);
    console.log('DynamoDB Record: %j', record.dynamodb);
});
callback(null, "message");
};
```

To create this function, the sample code is copied into a file named index.js and a deployment package is created. A Lambda function is then created with the create-function command. A DynamoDB table may be created in the DynamoDB 330 for a user with a stream enabled and the stream is associated with the Lambda function by creating an event source mapping in the Lambda service 320. A DynamoDB stream may be associated with multiple Lambda functions and the same Lambda function may be associated with multiple streams. During operation, as the tables in the DynamoDB 330 are updated, the DynamoDB 330 may write event records to the stream. As the Lambda service 320 polls the stream, it detects new records in the stream and executes the Lambda function by passing the event data it finds in the stream to the function. In the above example, logs are created in CloudWatch.

Figure 4:
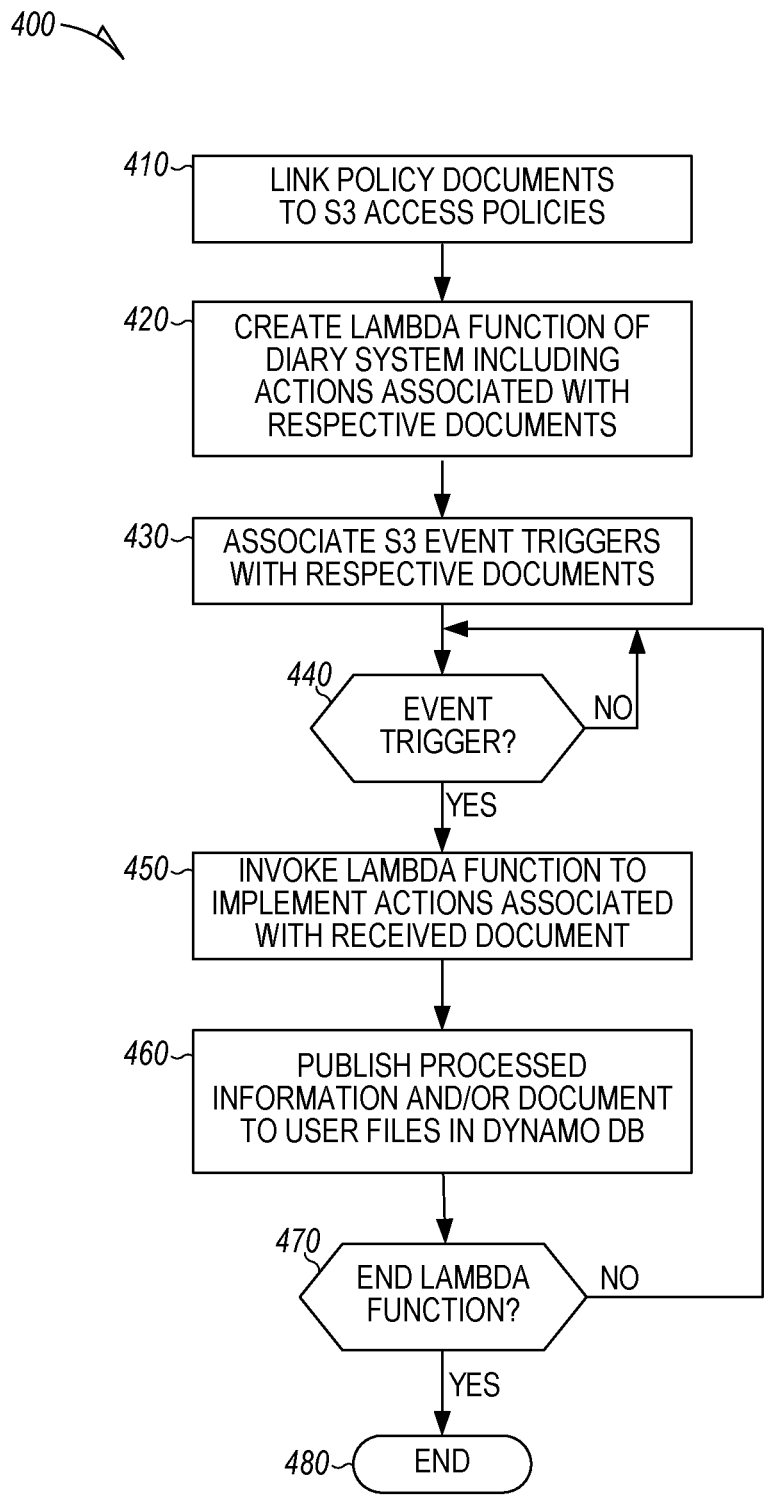
FIG. 4 illustrates an embodiment of a document management process implemented on the AWS system platform illustrated in FIG. 3.

FIG. 4 illustrates an embodiment of document management 400 on the AWS system platform 300 illustrated in FIG. 3. As illustrated in FIG. 4, insurance policy documents (e.g., home inspection documents) are created and associated with a specified insurance policy, for example, and are linked at 410 to S3 access policies that specify who may have access to the specified document. For example, the JSON structure of an insurance policy may specify the primitive data structure for the insurance policy that is uploaded and linked to respective documents in the form of PDF files. In sample embodiments, the JSON structure sets forth the order of processing of the respective documents and access policies and has five attributes. A Lambda function of the diary system 120 including the actions associated with the respective documents is created at 420. As noted above, the diary system 120 may specify the processing actions to be conducted upon receipt of a specified document. An S3 event trigger is associated with the respective documents at 430. Thus, when a document is received by the S3 system 310, an event is triggered in the diary system 120. For example, the uploading of a home inspection may include a home inspection score that flags review of a home loan application by the underwriter. On the other hand, another review or inspection may be ordered. The processed results are provided to the DynamoDB 330 which may initiate further diary entries in the user files 360 as noted above. Such processed results may include analytics based on data collected from all sources, building costs, processing of relevant Internet of Things (IoT) sensor data, and the like. It will be further appreciated that multiple routes may be provided for different folders and that the same data may be provided to multiple folders.

During operation, when documents are uploaded (object created) or removed (object removed), an event trigger for a specific bucket is created by the S3 system 310. The event trigger is detected at 440, and the corresponding Lambda function for diary system 120 is invoked at 450 to implement the actions associated with the received document (or removed document). The results of processing the actions and/or the documents are published to the user files 360 in DynamoDB 330 at 460. If it is determined at 470 that the Lambda function is completed (e.g., all documents have been collected), the policy management process 400 ends at 480. However, if there are more documents to process, the document management process 400 returns to 440 to await the next event trigger. Also, the JSON data structure of the Lambda function may be batch processed in a chron job at least daily while some actions automatically trigger the next process task of the diary system 120. Moreover, if the policy management system 300 fails for any reason, the policy management process 400 may resend event triggers and restart automatically.

In this manner, the disclosed systems and methods provide the practical application of a policy management system that uses SFTP functionality to drive the collection and integration of documents into the policy management system as well as a JSON data structure and event notifications to populate insurance policy data. For example, the system described herein may schedule inspections, drive the completion of the inspection documents, and notify all relevant parties (e.g., via email) when the inspection report is uploaded into the policy management system. The system would trigger that the inspection has arrived and immediately send the inspection files to all who need that information and, as appropriate, trigger real-time analysis of the uploaded documents. In this manner, all policies requiring an inspection may be immediately updated upon receipt of the inspection report without waiting for human intervention. The resulting policy management system reduces human error, improves data consistency, and increases speed as the need for human lookup of information in completing the underwriting process is significantly reduced. As underwriting processes are common components of insurance applications, loan applications, applications for club memberships, and other online applications, the systems and methods described herein provide practical applications rooted in computer technology to provide benefits unique to computer networks to enhance the user's experiences in the online environment.

Modules, Components, and Logic

Certain embodiments are described herein as being implemented on platforms such as AWS that include software or logic or a number of components, modules, or mechanisms. Modules may constitute either software modules (e.g., code embodied on a machine-readable storage device) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a FPGA or an ASIC. A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" or "hardware processor" as used herein should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS) where the services are provided by transaction, by processor cycles used, by time, by bandwidth consumed, and the like. At least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-4 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Example Machine Architecture and Machine-Readable Storage Device

Figure 5:
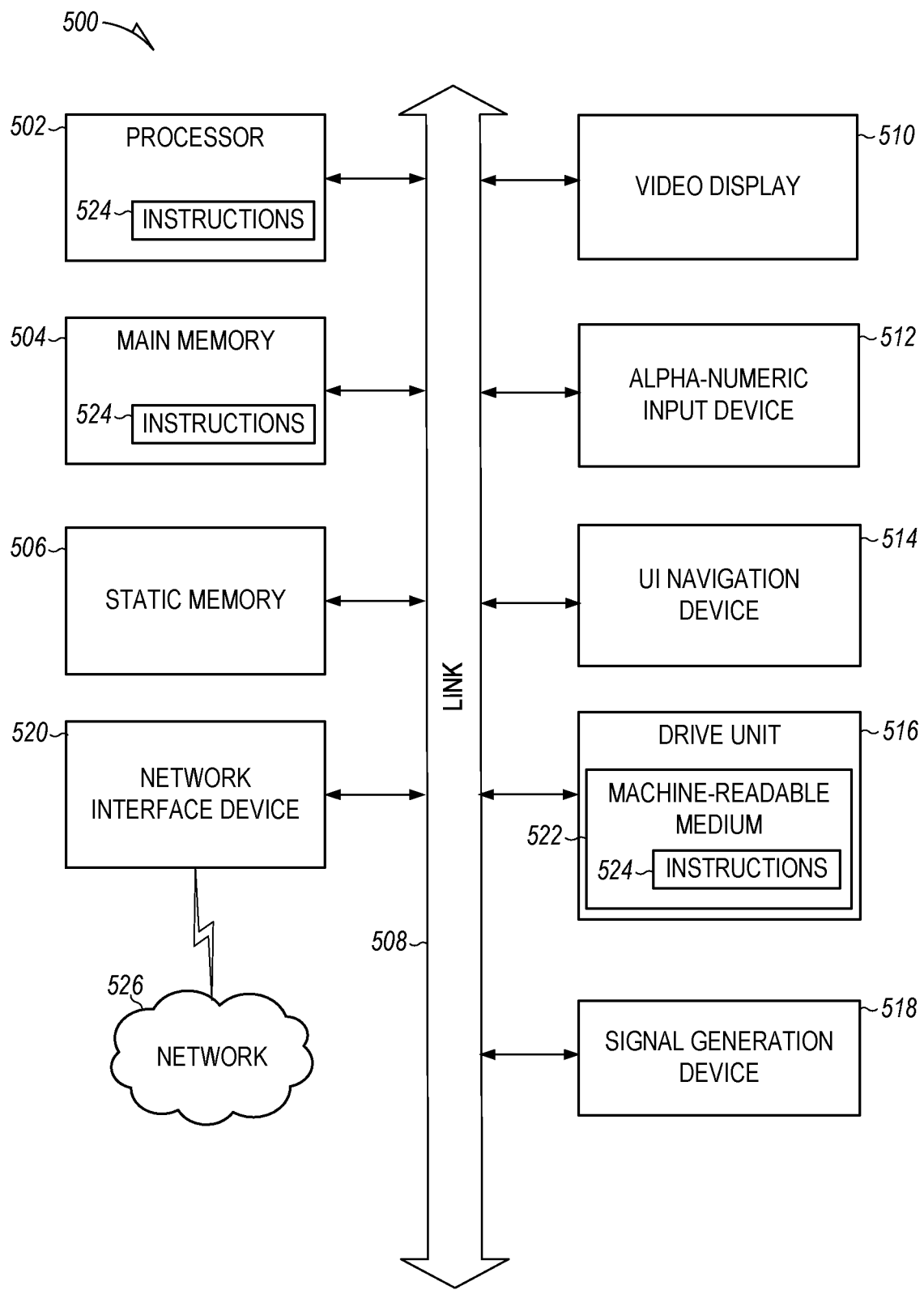
FIG. 5 is a block diagram illustrating components of a machine, according to some example embodiments, able to read instructions from a machine-readable storage device and perform any one or more of the methodologies discussed herein.

FIG. 5 is a block diagram illustrating components of a machine 500, according to some example embodiments, able to read instructions from a machine-readable storage device and to perform any one or more of the methodologies discussed herein. In this example, machine 500 may correspond to the policy management system 100 for implementing the policy management method 200 as well as the policy management system 300 that implements the policy management method 400 using AWS services. In these examples, the respective policy management systems 100 and 300 may include more than one processor 502 to execute or implement one or more of the application(s)/platform(s) described herein. The one or more processors 502 may be any type of commercially available processor, such as processors available from the Intel Corporation, Advanced Micro Devices, Texas Instruments, or other such processors. Further still, the one or more processors 502 may include one or more special-purpose processors, such as a Field-Programmable Gate Array (FPGA) or an Application Specific Integrated Circuit (ASIC). The one or more processors 502 may also include programmable logic or circuitry that is temporarily configured by software to perform certain operations. Thus, once configured by such software, the one or more processors become specific machines (or specific components of a machine) uniquely tailored to perform the configured functions and are no longer general-purpose processors.

The policy management systems 100 and 300 described herein may further include various storage device(s) and/or machine-readable storage devices for storing the application(s)/platform(s) and/or the documents and other data from the user and/or respective third-parties. The machine-readable storage device includes one or more devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable storage device" should be taken to include a single storage device or multiple media (e.g., a centralized or distributed database, or associated caches and servers) able to store the application(s)/platform(s) and/or the documents and other data from the user and/or the respective third-parties. Accordingly, the machine-readable storage device may be implemented as a single storage apparatus or device, or, alternatively and/or additionally, as "cloud-based" storage systems or storage networks such as the S3 system 310 that include multiple storage apparatus or devices.

In one embodiment, the application(s)/platform(s) are written in a computer-programming and/or scripting language. Examples of such languages include, but are not limited to, C, C++, C #, Java, JavaScript, Perl, Python, or any other computer programming and/or scripting language now known or later developed.

Specifically, FIG. 5 shows a diagrammatic representation of the machine 500 in the example form of a computer system, within which instructions 524 (e.g., software, a program, an application, an applet, an app, or other executable code) for causing the machine 500 to execute any one or more of the methodologies discussed herein. For example, the instructions 524 may cause the machine 500 to execute the flow diagrams of FIG. 2 and FIG. 4. Additionally, or alternatively, the instructions 524 may implement one or more of the components of FIG. 1 and FIG. 3. The instructions 524 transform the general, non-programmed machine 500 into a special purpose machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a PDA, or any machine capable of executing the instructions 524, sequentially or otherwise, that specify actions to be taken by machine 500. Further, while only a single machine 500 is illustrated, the term "machine" shall also be taken to include a collection of machines 500 that individually or jointly execute the instructions 524 to perform any one or more of the methodologies discussed herein.

The machine 500 may include processors 502, main memory/storage 504, 506, and I/O components 520, which may be configured to communicate with each other such via a bus 508. In an example embodiment, the processors 502 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may execute the instructions 524. The term "processor" is intended to include multi-core processor that may comprise two or more independent processors (sometimes referred to as "cores") that may execute instructions 524 contemporaneously. The machine 500 also may include a single processor with a single core, a single processor with multiple cores (e.g., a multi-core process), multiple processors with a single core, multiple processors with multiples cores, or any combination thereof.

The memory/storage 504, 506 may include a memory such as a main memory 504, or other memory storage, and a static memory 506, both accessible to the processors 502 via the bus 508. The main memory 504 stores the instructions 524 embodying any one or more of the methodologies or functions described herein. The instructions 524 may also reside, completely or partially, within the memory 506, within the drive unit 516, within at least one of the processors 502 (e.g., within the processor's cache memory), or any suitable combination thereof, during execution thereof by the machine 500. Accordingly, the memory 506, the drive unit 516, and the memory of processors 502 are examples of machine-readable media.

As used herein, "machine-readable storage device" means a device able to store instructions 524 and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable storage device" should be taken to include a single storage device or multiple media (e.g., a centralized or distributed database, or associated caches and servers) able to store instructions 524. The term "machine-readable storage device" shall also be taken to include any medium, or combination of multiple media, that is capable of storing instructions (e.g., instructions 524) for execution by a machine (e.g., machine 500), such that the instructions, when executed by one or more processors of the machine 500 (e.g., processors 502), cause the machine 500 to perform any one or more of the methodologies described herein. Accordingly, a "machine-readable storage device" refers to a single storage apparatus or device 522, as well as "cloud-based" storage systems or storage networks that include multiple storage apparatus or devices. The term "machine-readable storage device" excludes signals per se.

The input/output (I/O) components 510, 512 may include a wide variety of components to receive input, provide output, produce output, transmit information, exchange information, capture measurements, and so on. The specific I/O components 510, 512 that are included in a particular machine will depend on the type of machine. For example, portable machines such as mobile phones will likely include a touch input device or other such input mechanisms, while a headless server machine will likely not include such a touch input device. It will be appreciated that the I/O components 510, 512 may include many other components that are not shown in FIG. 5. The I/O components 510, 512 are grouped according to functionality merely for simplifying the discussion herein and the grouping is in no way limiting. In various example embodiments, the I/O components 510, 512 may include output components 510 and input components 512. The output components 510 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 512 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 510, 512 may include biometric components, motion components, environmental components, or position components among a wide array of other components. For example, the biometric components may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components may include acceleration sensor components (e.g., accelerometer), gravitation sensor components, rotation sensor components (e.g., gyroscope), and so forth. The environmental components may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 518, 520 may include communication components operable to couple the machine 500 to a network 526 or external devices via appropriate coupling (not shown). For example, the communication components 518, 520 may include a network interface component 520 or other suitable device such a signal generator 518 to interface with the network 526. In further examples, communication components 518, 520 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The external devices may be another machine or any of a wide variety of peripheral devices (e.g., a peripheral device coupled via a USB).

Moreover, the communication components 518, 520 may detect identifiers or include components operable to detect identifiers. For example, the communication components 518, 520 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF, Ultra Code, UCC RSS-2D bar code, and other optical codes), or acoustic detection components (e.g., microphones to identify tagged audio signals). In addition, a variety of information may be derived via the communication components 518, 520, such as location via Internet Protocol (IP) geo-location, location via Wi-Fi® signal triangulation, location via detecting a NFC beacon signal that may indicate a particular location, and so forth. UI navigation devices 514 may also be provided as appropriate for the particular application.

Transmission Medium

In various example embodiments, one or more portions of the network 526 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 526 or a portion of the network 526 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 524 may be transmitted or received over the network 526 using a transmission medium via a network interface device (e.g., a network interface component included in the communication components 518, 520) and utilizing any one of a number of well-known transfer protocols (e.g., hypertext transfer protocol (HTTP)). Similarly, the instructions 524 may be transmitted or received using a transmission medium via the coupling (e.g., a peer-to-peer coupling) to external devices. The term "transmission medium" shall be taken to include any intangible medium that is capable of storing, encoding, or carrying instructions 524 for execution by the machine 500, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated or by the particular elements identified. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

NUMBERED EXAMPLES

Certain embodiments are described herein as numbered examples 1, 2, 3, etc. These numbered examples are provided as examples only and do not limit the subject technology.

Example 1 is a system comprising a memory system that receives documents and data related to an insurance policy; a machine-readable storage device that stores computer-executable instructions; and at least one hardware processor communicatively coupled to the machine-readable storage device that, when the computer-executable instructions are executed, configures the system to integrate documents and data into a policy management system by identifying documents and data required for an insurance policy and designating access rights to the documents and data by at least one of users and vendors; specifying actions to be performed upon receipt of the identified documents and data; and creating event triggers to cause performance of the specified actions associated upon receipt of an uploaded document or data; and an SFTP system pushing at least one of the uploaded documents and results from performance of the specified actions to at least one of the users and vendors having access rights to the at least one of the uploaded documents and results.

Example 2 is the system as in Example 1 wherein the instructions for identifying the documents and data required for an insurance policy comprises instructions for representing the insurance policy in a JSON data structure that defines the document and data management policies for the insurance policy and an order of process tasks associated with the documents and data required for the insurance policy.

Example 3 is the system as in any preceding Example wherein the JSON data structure provides at least one of field breakdowns and parsed fields of the insurance policy so that the at least one of the users and vendors only receive the portions of the documents and data relevant to the respective user or vendor.

Example 4 is the system as in any preceding Example wherein the actions to be performed upon receipt of the identified documents and data are specified by a diary system for the insurance policy.

Example 5 is the system as in any preceding Example wherein the memory system issues an event trigger upon receipt of a document or data related to the insurance policy, wherein the event trigger causes a notification to be sent to the SFTP system to initiate performance of the actions associated with the document or data that caused the event trigger.

Example 6 is the system as in any preceding Example wherein the SFTP system publishes the document or data associated with the event trigger and results from performance of the specified actions to a file folder in a database, the file folder having access rights limited to the user or vendor having access rights to the document or data associated with the event trigger.

Example 7 is the system as in any preceding Example wherein the SFTP system comprises an SFTP service that is invoked upon receipt of an event trigger to invoke a diary system for the insurance policy that links the insurance policy to the documents and data required for the insurance policy.

Example 8 is a method of integrating documents and data into a policy management system, the method comprising identifying documents and data required for an insurance policy and designating access rights to the documents and data by at least one of users and vendors; specifying actions to be performed upon receipt of the identified documents and data; creating event triggers to cause performance of the specified actions associated upon receipt of an uploaded document or data; and pushing, by an SFTP system, at least one of the uploaded documents and results from performance of the specified actions to at least one of the users and vendors having access rights to the at least one of the uploaded documents and results.

Example 9 is a method as in Example 8 wherein identifying the documents and data required for an insurance policy comprises representing the insurance policy in a JSON data structure that defines the document and data management policies for the insurance policy and an order of process tasks associated with the documents and data required for the insurance policy.

Example 10 is a method as in Examples 8 and 9 further comprising providing at least one of field breakdowns and parsed fields of the insurance policy in the JSON data structure and providing to the at least one of the users and vendors only the portions of the documents and data relevant to the respective user or vendor.

Example 11 is a method as in Examples 8-10 wherein specifying the actions to be performed upon receipt of the identified documents and data comprises programming a diary system for the insurance policy with the actions to be performed upon receipt of each document and data associated with the insurance policy.

Example 12 is a method as in Examples 8-11 wherein creating event triggers comprises a memory system issuing an event trigger upon receipt of a document or data related to the insurance policy, wherein the event trigger causes a notification to be sent to the SFTP system to initiate performance of the actions associated with the document or data that caused the event trigger.

Example 13 is a method as in Examples 8-12 further comprising the SFTP system publishing the document or data associated with the event trigger and results from performance of the specified actions to a file folder in a database, the file folder having access rights limited to the user or vendor having access rights to the document or data associated with the event trigger.

Example 14 is a method as in Examples 8-13 further comprising invoking an SFTP service upon receipt of an event trigger, the SFTP service invoking a diary system for the insurance policy that links the insurance policy to the documents and data required for the insurance policy.

Example 15 is a machine-readable storage device that stores computer-executable instructions that, when executed by at least one processor, implements a method of integrating documents and data into a policy management system, comprising identifying documents and data required for an insurance policy and designating access rights to the documents and data by at least one of users and vendors; specifying actions to be performed upon receipt of the identified documents and data; creating event triggers to cause performance of the specified actions associated upon receipt of an uploaded document or data; and pushing at least one of the uploaded documents and results from performance of the specified actions to at least one of the users and vendors having access rights to the at least one of the uploaded documents and results.

Example 16 is a device as in Example 15 wherein instructions for identifying the documents and data required for an insurance policy comprises instructions for representing the insurance policy in a JSON data structure that defines the document and data management policies for the insurance policy and an order of process tasks associated with the documents and data required for the insurance policy.

Example 17 is a device as in Examples 15 and 16 further comprising instructions for providing at least one of field breakdowns and parsed fields of the insurance policy in the JSON data structure and for providing to the at least one of the users and vendors only the portions of the documents and data relevant to the respective user or vendor.

Example 18 is a device as in Examples 15-17 wherein instructions for creating event triggers comprises instructions for causing a memory system to issue an event trigger upon receipt of a document or data related to the insurance policy, wherein the event trigger causes a notification to be sent to an SFTP system to initiate performance of the actions associated with the document or data that caused the event trigger.

Example 19 is a device as in Examples 15-18 further comprising instructions for causing the SFTP system to publish the document or data associated with the event trigger and results from performance of the specified actions to a file folder in a database, the file folder having access rights limited to the user or vendor having access rights to the document or data associated with the event trigger.

Example 20 is a device as in Examples 15-19 further comprising instructions for invoking an SFTP service upon receipt of an event trigger, the SFTP service invoking a diary system for the insurance policy that links the insurance policy to the documents and data required for the insurance policy.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The systems and methods described herein are captured within the scope of the following claims. It is understood by those skilled in the art that the claims encompass specific embodiments as well as embodiments that are not specifically described herein but which may include equivalent components and steps to those described herein as well as other features and modifications that would be apparent to those skilled in the art.

The invention claimed is:

1. A policy management system that automatically triggers actions upon receipt of electronic documents or data, comprising:
   a memory system that receives electronic documents and data and provides event data upon receipt of at least one of an electronic document or data related to underwriting of an insurance policy;
   a machine-readable storage device that stores computer-executable instructions including a diary system that implements a document management policy that identifies and tracks items and an order of actions needed for completion of underwriting of the insurance policy; and
   at least one processor communicatively coupled to the machine-readable storage device that, when the computer-executable instructions are executed, configures the system to perform operations including:
      providing an interface through which a user may specify electronic documents and data required for completing underwriting of an insurance policy and may designate access rights to the electronic documents and data, the interface further enabling the user to specify the actions to be performed by the diary system upon receipt of the event data;
      programming into the diary system the electronic documents and data required for completion of underwriting of the insurance policy with the actions to be taken by the least one processor upon receipt of the event data, wherein the insurance policy is represented in a JavaScript Object Notation (JSON) data structure in the diary system, the JSON data structure defining document and data management policies for underwriting the insurance policy and an order of actions associated with the electronic documents and data required for underwriting the insurance policy;
      upon receipt of the at least one electronic document or data by the memory system, passing first event data as a parameter to the diary system;
      invoking an action specified in the diary system that is to be taken by the at least one processor upon receipt of the first event data;
      automatically pushing at least one of the received electronic document, received data, or results from performance of the action specified in the diary system to at least one user or vendor having access rights to the at least one of the received electronic document, received data, or results; and
      advancing the diary system to await second event data to invoke a next action specified by the document management policy of the diary system upon receipt of the second event data.

2. A system as in claim 1, wherein the JSON data structure in the diary system provides at least one of field breakdowns and parsed fields of the insurance policy relevant to a respective user or vendor of the at least one user or vendor, and the at least one processor executes instructions to automatically push at least one of the received electronic document or received data by providing to the respective user or vendor only portions of the electronic documents or data relevant to the respective user or vendor.

3. A system as in claim 1, wherein the diary system includes a listing of electronic documents required to complete underwriting of the insurance policy and associated actions to be completed upon receipt of a particular electronic document associated with the insurance policy.

4. A system as in claim 1, wherein the at least one processor further executes instructions to publish the at least one electronic document or data associated with the event data and results from performance of the actions specified in the diary system to a file folder in a database, the file folder having access rights limited to the at least one user or vendor having access rights to the at least one electronic document or data associated with the event data.

5. A system as in claim 3, wherein the at least one processor further executes instructions to invoke a secure file transfer protocol (SFTP) service upon receipt of the first or second event data to invoke the diary system for the insurance policy to link the insurance policy to the electronic documents and data required for underwriting of the insurance policy.

6. A computer-implemented method of automatically triggering actions upon receipt of electronic documents or data by a policy management system, the method comprising:
  providing, by at least one processor, an interface through which a user may specify electronic documents and data required for completing underwriting of an insurance policy and may designate access rights to the electronic documents and data by at least one of users and vendors;
  determining, by the at least one processor, actions to be performed by a diary system upon receipt of event data, the event data being provided by a memory system upon receipt of at least one of an electronic document or data related to underwriting of the insurance policy and the diary system implementing a document management policy that identifies and items and an order of actions needed for completion of underwriting of the insurance policy;
  programming, by the at least one processor, into the diary system the electronic documents and data required for completion of underwriting of the insurance policy with the actions to be taken upon receipt of the event data, wherein the insurance policy is represented in a JavaScript Object Notation (JSON) data structure in the diary system, the JSON data structure defining document and data management policies for underwriting the insurance policy and an order of actions associated with the electronic documents and data required for underwriting the insurance policy;
  upon receipt of the at least one electronic document or data by the memory system, passing, by the at least one processor, first event data as a parameter to the diary system;
  invoking, by the at least one processor, an action specified in the diary system that is to be taken by a secure file transfer protocol (SFTP) system upon receipt of the first event data;
  automatically pushing, by the SFTP system, at least one of the received electronic document, received data, or results from performance of the action specified in the diary system to at least one user or vendor having access rights to the at least one of the received electronic document, received data, or results; and
  advancing, by the at least one processor, the diary system to await second event data to invoke a next action specified by the document management policy of the diary system upon receipt of the second event data.

7. A method as in claim 6, further comprising providing at least one of field breakdowns and parsed fields of the insurance policy relevant to a respective user or vendor of the at least one user or vendor in the JSON data structure in the diary system, and automatically pushing at least one of the received document or received data by providing to the respective user or vendor only portions of the electronic documents or data relevant to the respective user or vendor.

8. A method as in claim 6, wherein the diary system includes a listing of electronic documents required to complete underwriting of the insurance policy and associated actions to be completed upon receipt of a particular electronic document associated with the insurance policy.

9. A method as in claim 6, further comprising the SFTP system publishing the at least one electronic document or data associated with the event data and results from performance of the actions specified in the diary system to a file folder in a database, the file folder having access rights limited to the at least one user or vendor having access rights to the at least one electronic document or data associated with the event data.

10. A method as in claim 8, further comprising invoking an SFTP service upon receipt of the first or second event data, the SFTP service invoking the diary system for the insurance policy to link the insurance policy to the electronic documents and data required for underwriting of the insurance policy.

11. A machine-readable storage device that stores computer-executable instructions that, when executed by at least one processor, implements a method of automatically triggering actions upon receipt of electronic documents or data by a policy management system, comprising:
  providing an interface through which a user may specify electronic documents and data required for completing underwriting of an insurance policy and may designate access rights to the electronic documents and data by at least one of users and vendors;
  specifying actions to be performed by a diary system upon receipt of event data, the event data being provided by a memory system upon receipt of at least one of an electronic document or data related to underwriting of the insurance policy and the diary system implementing a document management policy that identifies and items and an order of actions needed for completion of underwriting of the insurance policy;
  programming into the diary system the electronic documents and data required for completion of underwriting of the insurance policy with the actions to be taken by the least one processor upon receipt of the event data, wherein the insurance policy is represented in a JavaScript Object Notation (JSON) data structure in the diary system, the JSON data structure defining document and data management policies for underwriting the insurance policy and an order of actions associated with the electronic documents and data required for underwriting the insurance policy;
  upon receipt of the at least one electronic document or data by the memory system, passing first event data as a parameter to the diary system;
  invoking an action specified in the diary system that is to be taken by the least one processor upon receipt of the first event data;
  automatically pushing at least one of the received electronic document, received data, or results from performance of the action specified in the diary system to at least one user or vendor having access rights to the at least one of the received electronic document, received data, or results; and advancing the diary system to await second event data to invoke a next action specified by the document management policy of the diary system upon receipt of the second event data.

12. A device as in claim 8, further comprising instructions for providing at least one of field breakdowns and parsed fields of the insurance policy relevant to a respective user or vendor of the at least one user or vendor in the JSON data structure in the diary system, and for automatically pushing at least one of the received document or received data by providing to the respective user or vendor only portions of the electronic documents or data relevant to the respective user or vendor.

13. A device as in claim 11, further comprising instructions for causing the SFTP system to publish the at least one electronic document or data associated with the event data and results from performance of the actions specified in the diary system to a file folder in a database, the file folder having access rights limited to the at least one user or vendor having access rights to the at least one electronic document or data associated with the event data.

14. A device as in claim 11, further comprising instructions for invoking an SFTP service upon receipt of the first or second event data, the SFTP service invoking the diary system for the insurance policy to link the insurance policy to the electronic documents and data required for underwriting of the insurance policy.

* * * * *